United States Patent [19]
Brady et al.

[11] 3,948,865
[45] Apr. 6, 1976

[54] CHEMICAL TREATMENT OF ARYLENE SULFIDE POLYMERS

[75] Inventors: Donnie G. Brady; Jennings P. Blackwell, both of Bartlesville, Okla.

[73] Assignee: Phillips Petroleum Company, Bartlesville, Okla.

[22] Filed: Oct. 31, 1974

[21] Appl. No.: 519,666

[52] U.S. Cl. .................. 260/79; 260/79.1; 264/122; 264/126; 264/331; 427/302; 427/322; 427/385; 427/388
[51] Int. Cl.² ........................................ C08G 75/00
[58] Field of Search .......... 260/79, 79.1; 117/47 A, 117/138.8 A; 264/122, 126, 331; 427/302, 322, 385, 388

[56] References Cited
UNITED STATES PATENTS

| | | |
|---|---|---|
| 3,326,865 | 6/1967 | Smith ............................... 260/79.3 |
| 3,354,129 | 11/1967 | Edmonds, Jr. et al. ............... 260/79 |
| 3,622,376 | 11/1971 | Tieszen et al. ........................ 260/79 |
| 3,699,087 | 10/1972 | Wood et al. ........................... 260/79 |
| 3,717,620 | 2/1973 | Rohlfing ............................... 260/79 |
| 3,793,256 | 2/1974 | Scoggin ................................ 260/79 |
| 3,839,301 | 10/1974 | Scoggins .............................. 260/79 |
| T911,007 | 6/1973 | Taylor ............................. 260/607 A |

*Primary Examiner*—M. J. Welsh

[57] ABSTRACT

The properties of arylene sulfide polymers are improved by treating the polymer with a fluid treating agent selected from the group consisting of hydrogen peroxide, an alkali metal or alkaline earth metal hypochlorite, sulfuric acid, chlorine, sulfuryl chloride, nitrogen dioxide, chromium trioxide, alkali metal permanganates and nitric acid under conditions of concentration of treating agent, time and temperature to effect the desired improvement.

8 Claims, No Drawings

CHEMICAL TREATMENT OF ARYLENE SULFIDE POLYMERS

This invention relates to arylene sulfide polymers having improved properties.

In the years following their initial development, poly(arylene sulfides) have become commercially important resins and the products prepared therefrom are finding increasing utility because of their outstanding durability, toughness, inertness, and versatility. Such resins, though relatively high melting, are thermoplastic resins which can be cured both in the resin form and in the molded product from under various conditions to provide a broad range of resin processability and product toughness.

The virgin poly(arylene sulfide) resin generally has a relatively high melt flow and it is known that it has to be pre-cured in order to make it convenient for use in some applications. The extent of cure and the final melt flow which is attained depends upon the intended end use of the polymer. It should be noted that the term "curing" with respect to arylene sulfide polymers is not necessarily synonymous with the meaning of that term when applied to other polymers such as in the curing of natural or synthetic rubber with sulfur as vulcanizing agent or the curing of unsaturated polyester compositions with styrene as crosslinking agent. The complete curing of such rubber or unsaturated polyester compositions results in an irreversible conversion from the thermoplastic state to the thermoset state. The curing of poly(arylene sulfide) resins, on the other hand, differs in that these polymers are thermoplastic both before and after such curing although not necessarily to the same degree. Thus, the curing of poly(arylene sulfide) resins and objects formed therefrom produces changes in extrudability, toughness, and other important properties. Such curing is frequently carried out by heating at elevated temperatures in air.

To extend the value of such poly(arylene sulfide) resins and the utility of the products prepared therefrom, still further improvements have been sought with regard to improving the convenience and effectiveness of curing procedures and to still further improve the properties of formed products to meet the requirements of certain applications.

Accordingly, it is an object of this invention to provide a process for improving the properties of an arylene sulfide polymer.

Other objects, aspects and advantages of this invention will be readily apparent to those skilled in the art from the reading of the following disclosure.

In accordance with the present invention, there is provided a process for improving the physical and chemical properties of an arylene sulfide polymer which comprises treating such polymer with a fluid treating agent selected from the group consisting of hydrogen peroxide, an alkali metal or alkaline earth metal hypochlorite, sulfuric acid, chlorine, sulfuryl chloride, nitrogen dioxide, chromium trioxide, alkali metal permanganates and nitric acid under conditions of concentration of treating agent, time and temperature to effect the desired improvement.

The term "arylene sulfide polymer" and the term "poly(arylene sulfide) resin" are used interchangeably in this application. Both of these terms refer to an essentially formless, particulate material which those skilled in the art will recognize as being a raw material or feedstock for operations such as molding or coating.

In one embodiment, the invention provides a process for improving the curability of a poly(arylene sulfide) resin which comprises contacting a particulate poly(arylene sulfide) resin with at least one of the treating agents of this invention to reduce the melt flow of the resin to a level within the range of 0.1 to 70 percent of its original melt flow, preferably from 1 to 30 percent of the melt flow of the corresponding untreated resin, melt flow being measured according to ASTM-D-1238, Procedure B, at 550°F with a 5 kg weight.

In another embodiment of this invention, a poly(arylene sulfide) resin which has been treated in accordance with the resin treating process of the present invention is applied as a coating to a suitable substrate, which coated substrate is then cured in air under suitable conditions of time and temperature to produce an adhering and cohesive coating on the substrate.

In a further embodiment of this invention, a poly(arylene sulfide) resin which has been treated in accordance with the resin treating process of this invention, is molded or formed under suitable conditions of time, temperature and pressure to produce form-stable moldings or formed products.

The fluids which are suitable for use in the process of this invention are selected from the following:

1. Hydrogen peroxide. The hydrogen peroxide can be dissolved in glacial acetic acid, water or mixtures thereof. It is employed at a concentration ranging from 0.5 weight percent of the solution up to a saturated solution. Preferably the concentration is from 2 to 30 weight percent. A presently preferred solvent for the hydrogen peroxide is acetic acid containing a minor amount of water.

2. Alkali metal or alkaline earth metal hypochlorites. The hypochlorite is employed at a concentration ranging from 0.5 weight percent to saturated, in water solution; preferably at a concentration of from 1 to 20 weight percent. The presently preferred hypochlorite is sodium hypochlorite.

3. Sulfuric acid. Sulfuric acid can be employed at a concentration ranging from 100 percent to 90 percent in water solution.

4. Chlorine. Chlorine can be employed either as a gas or in liquid solution:
   a. Gaseous chlorine can be employed at a concentration ranging from essentially anhydrous chlorine gas to chlorine gas saturated with water vapor.
   b. Chlorine can be employed in either water or acetic acid solution at a concentration ranging from 0.1 weight percent to a saturated solution.

5. Sulfuryl chloride. Sulfuryl chloride can be employed in solution in an inert solvent at a concentration ranging from 50 to 100 weight percent sulfuryl chloride. Any solvent inert to sulfuryl chloride under the conditions of treatment can be employed, as for example, halogenated hydrocarbons.

6. Nitrogen dioxide.

7. Chromium trioxide. Chromium trioxide is employed in water solution at a concentration ranging from 0.5 weight percent to a saturated solution.

8. Alkali metal permanganates. The alkali metal permanganates are employed in water solution at a concentration ranging from 0.5 weight percent to a saturated solution.

9. Nitric acid. Nitric acid is employed at a concentration ranging from 35 to 70, preferably 50 to 70, weight percent in water solution.

Presently preferred treating fluids are those containing hydrogen peroxide, sodium hypochlorite or elemental chlorine.

Poly(arylene sulfide) resins which can be treated according to the process of the present invention are those resins which are solid, have a melting point of at least about 150°F and are usually insoluble in common solvents. Such resins can be convenienty prepared by the process disclosed in U.S. Pat. No. 3,354,129 to Edmonds et al. Briefly, the process comprises the reaction of an alkali metal sulfide and a polyhalo ring-substituted aromatic compound in the presence of a suitable polar organic compound, as for example, the reaction of sodium sulfide with dichlorobenzene in the presence of N-methyl-2-pyrrolidone to form poly(phenylene sulfide).

The conditions under which the process of the present invention are carried out will vary according to the treating fluid used and the desired results. The level or nature of the result is dependent upon the severity of treatment. An improvement in coating curability is generally obtained by treating at a relatively mild level of severity while improvement in processability can require a somewhat higher level of severity. For example, a poly(arylene sulfide) resin is rendered more processable, i.e., having a suitable melt viscosity in a free sintering molding operation, by subjecting the resin to a relatively high level of severity.

The level of treatment severity depends upon the combination of operating parameters used in the process, namely, the concentration of the treating agent in the treating fluid, the time of treatment and the temperature of treatment. In those treating fluids comprising a treating agent in a suitable solvent or diluent, the effective concentrations of the treating agent in the treating fluid are as described above in the paragraphs enumerating the applicable treating fluids. Generally, the treatment time will range from about 1 minute to about 72 hours, preferably from about 5 minutes to about 3 hours. The treatment temperature will range from about 25°C to about 150°C, preferably from about 50° to about 100°C. Ordinarily, pressure in the range of 0–500 psig are used. Operation at atmospheric pressure is convenient.

One skilled in the art will appreciate that because there are several parameters available in the invention process, several suitable combinations of conditions can be employed, not only to obtan the desired result, but also to provide convenience and ease of operation. Thus, with lower concentrations of the treating agent, higher temperatures and/or longer treatment times can be used. With lower temperatures, higher concentrations and/or longer treating times can be used. Similarly, with shorter treating times, higher concentrations and/or higher temperatures are used.

The contact of the treating fluid with the poly(arylene sulfide) resin can be carried out in any suitable manner, such as immersion, using any suitable apparatus. The process can be carried out batchwise or in continuous fashion.

The quantity of treating fluid with respect to the quantity of resin being treated can vary widely. If desired, a measured amount of treating agent can be contacted with a measured amount of material to be treated such as in a batch treatment operation. Alternatively, the material to be treated can be continuously contacted with a large excess of the treating fluid under conditions which are suitable to obtain the desired improvements. The specific amounts of treating agent or the specific conditions required to achieve the desired result can easily be determined by simple experimentation using a given poly(arylene sulfide) material and a given treating fluid.

After sufficient contact of the resin with the treating fluid, the treating fluid is removed by any suitable separation procedure. For example, a liquid treating fluid can be separated from the solid resin by filtration, centrifuging, decantation, etc. It is generally advisable to wash the resin with a suitable wash liquid such as water, followed by drying. Gaseous treating fluids are separated from the resin even more conveniently. Residual amounts of treating gases can be removed by aeration, displacement by inert gases, mild heating, etc.

Spent treating fluids can be fortified, as required, by the addition of fresh treating agents, and recycled to the process. If desired, small amounts of wetting agents, such as conventional nonionic surfactants, can be added to the liquid treating fluids to improve wettability.

Among the several advantages of this invention, poly(arylene sulfide) resins which have been treated according to the process of this invention are more easily curable and/or processable. For example, a poly(arylene sulfide) having a melt flow too high to be in the compression molding range can be subjected to the invention process to convert it to a resin of compression molding viscosity. Similarly, the curability of a poly(arylene sulfide) resin can be improved by the invention process such that an article molded from this resin or an article coated with this resin need not be exposed to curing temperatures as high as for curing times as long as those required for the corresponding untreated resin. This advantage is important when a relatively thin metal, such as thin wall aluminum cookware, is coated with a poly(arylene sulfide) resin. The process of this invention minimizes the need for long curing time or high curing temperature which could destroy the temper of the metal.

Further, the process of this invention provides a resin having the desired degree of processability in a shorter period of time than would be required using a thermocuring procedure.

Another advantage of the present invention is that resins treated according to the invention process are particularly suitable for the production of moldings by the procedure known as "free-sintering". In this procedure, the treated resin is blended with a reinforcing filler such as asbestos fibers and is subjected to a pressure of from 5,000 to 20,000 psig in a mold at ambient temperature. The mold is opened and the free-standing molded object is removed and subjected to temperatures of up to 700°F to complete the molding. Chemical treatment of the resin according to this invention can take the place of relatively long 500°F oven curing treatment which is otherwise required to provide a resin having sufficient "green strength" to survive the free-sintering step without sagging or deforming.

The poly(arylene sulfide) resins which are treated according to the treating process of the present invention exhibit improved curability and have utility in coating and molding or other forming processes.

When the treated resins are used in coating applications, they can be blended with suitable fillers or pigments such as titanium dioxide, then applied to a substrate with the aid of a volatilizable diluent such as water or ethylene glycol. Diluent-free procedures such as powder spraying or fluid bed coating can also be used. When a diluent-free procedure is used it is preferable that the substrate be heated before contact with the resin. After applying the resin, the coated article is heated at an elevated temperature, preferably from 500° to 900°F, in an oxygen-containing or oxygen-free atmosphere for about 1 minute to 24 hours to complete the fusion and curing of the resin coating.

When the treated resins are utilized in molding or other forming operations, they can be blended with fillers or reinforcing agents, such as glass fibers, if desired. Moldings can be prepared by means such as compression molding, injection molding or free-sintering. Compression and injection molding are generally carried out at temperatures above the melting point of the resin, e.g., 600°–900°F, at pressures of 100–1000 psig. The initial molding step of a free-sintering process is carried out below the melting point of the resin, usually at ambient temperature, at pressures of 5,000–20,000 psig. The final sintering step is carried out outside the mold at temperatures of up to 700°F in an oxygen-containing or oxygen-free atmosphere for up to about 24 hours. Compression or injection molded articles can be further cured or annealed, if desired, by heating the molded article at an elevated temperature but below the melting point of the polymer in an oxygen-containing or oxygen-free atmosphere for up to about 24 hours.

The following examples illustrate the invention.

EXAMPLE I

A series of tests was carried out in which poly(phenylene sulfide) resin powder (PPS) was treated with varying amounts of hydrogen peroxide in acetic acid. The PPS was a virgin material produced by the reaction of p-dichlorobenzene and sodium sulfide in the presence of N-methyl-2-pyrrolidone at about 500°F using the procedure of U.S. Pat. No. 3,354,129. The resin powder was finer than 60 mesh and had a melting point of about 545°F.

432 g (4.0 mol equivalents) PPS, 1,200 ml glacial acetic acid and 114 g 30% aqueous hydrogen peroxide (1 mol) were charged to a 2 liter, 3-neck flask equipped with a stirrer and reflux condenser. The stirred mixture was heated at reflux for 1.5 hours. The mixture tested negative to starch-iodide paper after about 20 minutes at reflux. The system was cooled to room temperature and the solid was removed by filtration, washed thoroughly with distilled water and dried to give 423 g of treated PPS resin. Similarly, other portions of PPS were treated and recovered as above, but with varying amounts of hydrogen peroxide.

Qualitative observations of fusibility and curability of the treated PPS samples were made by placing the samples on a 800°–900°F hot plate. Curability was evaluated by the relative rate at which a sample of molten resin increased in viscosity while being worked with a spatula.

Additionally, the treated resins were subjected to a coating test. In this test, a coating formulation was prepared by blending three parts of PPS, one part of titanium dioxide and six parts of propylene glycol. The coating formulation was then applied to 3 × 6-inch cold rolled steel panels using a coating rod. Three 1-mil coats were applied to each panel. Each coat was cured at the temperatures and time specified below prior to application of any subsequent coat and before testing. The results shown below are of a 3/16-inch mandrel bend.

Table I

| $H_2O_2$ Equiv.[1] | \multicolumn{5}{c}{$H_2O_2$-Treated PPS Resin Coating Test Results at °F/min.[2]} | Comments |
|---|---|---|---|---|---|---|
| | 575/60 | 600/15 | 600/30 | 700/15 | 700/30 | |
| 0 (Control) | 5 | 4 | 3 | 2 | 1 | Cures at moderate rate, tan coating, good adhesion |
| 2 | — | — | — | — | — | infusible |
| 1 | — | — | — | — | — | infusible |
| 0.5 | — | — | — | — | — | barely fusible, cures fast, not suitable for coating |
| 0.35 | — | 2 | 2 | 2 | — | partly fusible, cures fast, rough coating, good adhesion |
| 0.25 | 1 | 3 | 1 | 1 | 1 | fusible, cures fast, smooth coating, good adhesion |
| .125 | — | 3 | 2 | 1 | 1 | fusible, cures slightly faster than control, smooth coating, good adhesion |

[1]Equivalents per sulfide linkage. Treatment carried out in acetic acid at reflux.
[2]Rating of 1 is best (no cracking); 5 is worst (severe cracking).

The data in Table I show that treatment of virgin PPS resin with hydrogen peroxide can produce widely varying results, depending upon the severity of treatment. Severe treatment with relatively large amounts of hydrogen peroxide produces an infusible resin powder which does not melt at temperatures as high as 900°F. On the other hand, mild treatment with relatively small amounts of hydrogen peroxide produces a fusible PPS resin having a slightly higher rate of curability than the virgin resin. In between these two extremes of treatment is a valuable range in which there is produced a PPS resin which can be cured in a shorter time and/or at a lower curing temperature.

EXAMPLE II

Another series of coating tests was conducted using the PPS which was employed in Example I. The PPS was treated with about 0.25 equivalents of hydrogen peroxide according to the procedure given in Example I. The coating formulation was an aqueous ball milled slurry containing 100 parts PPS, 33 parts titanium dioxide and 20 parts polytetrafluoroethylene by weight. For purposes of comparison, a similar coating formulation was prepared and tested using untreated PPS.

The coating formulations were sprayed onto thin aluminum coupons to a thickness of about 1 mil. The coated coupons were cured in air at the temperatures and times shown below. The cured coupons were annealed for 2 hours at 450°F then tested for 3/16-inch mandrel bend rating. A rating of 1 is best (no cracks); a rating of 2 represents the presence of a few microcracks barely visible under 20X magnification; and a rating of 5 is poor (severe cracking). The results of these tests are shown in the following table:

Table II

3/16-Inch Mandrel Bend Rating

| Curing Conditions | | |
|---|---|---|
| Temp:Time | Untreated PPS | Treated PPS |
| 600° F. | | |
| 1 min. | — | 3 |
| 5 min. | — | 3 |
| 10 min. | 3 | 2–3 |
| 15 min. | 3 | 1 |
| 650° F. | | |
| 1 min. | — | 3 |
| 3 min. | 3 | 2 |
| 5 min. | 3 | 1–2 |
| 10 min. | 3 | 1–2 |
| 15 min. | 3 | 1–2 |
| 700° F. | | |
| 1 min. | 3 | 2–3 |
| 3 min. | 3 | 1–2 |
| 5 min. | — | 1–2 |
| 10 min. | — | 1–2 |
| 15 min. | — | 1–2 |
| 30 min. | 1–2 | — |

The above data show that the hydrogen peroxide treated PPS substantially reduces both the time and temperature required to provide a satisfactory 1-mil release coating on aluminum. The data show that PPS resin treated according to the process of this invention can be cured in 15 minutes at 600°F, 5 minutes at 650°F and 3 minutes at 700°F in sharp contrast to the time and temperature required to cure the untreated PPS.

EXAMPLE III

Another series of tests was carried out in which the PPS resin was contacted with the treating agents of the invention in liquid phase treatments. In general, the resin powder was contacted with an excess quantity of treating agent; the extent of treatment was regulated by controlling the time and temperature of the contacting. By excess treating agent it is meant that there was initially present a large excess of mol equivalents of treating agent per mole of sulfide linkage. The runs were carried out in the presence of very minor amounts of commercial surfactants to improve the wettability of the resin powder with the treating solutions.

The modified resins were compared in coating and fusibility and curability tests as previously described. The results of these tests, together with essential treating conditions, are shown in Table III below.

Table III

Chemical Treatments of PPS Resins

| Treating Agent | Time | Temp. | Coating Rating 600°F/30 min. | Remarks |
|---|---|---|---|---|
| None (control) | — | — | 3 | fuses at 600°F |
| 5–6% NaOCl in $H_2O$ | 30 min. | 25–90°C | 1 | incompletely fused at 600°F |
| 5–6% NaOCl in $H_2O$ | 30 min. | 40–90°C | 2–3 | incompletely fused at 600°F |
| 5–6% NaOCl in $H_2O$ | 20 hrs. | 25–100°C | — | infusible |
| Conc. $H_2SO_4$ (95–97%) | 5 min. | 60°C | 3 | cured rapidly on hot plate |
| 90% $H_2SO_4$ in $H_2O$ | 1 hr. | 30°C | — | cured similar to control |
| Conc. $H_2SO_4$ (95–97%) | 30 min. | 60–80°C | — | infusible |
| 35% $HNO_3$ in $H_2O$ | 10 min. | 40°C | — | cured rapidly on hot plate |
| 70% $HNO_3$ in $H_2O$ | 15 min. | 30–40°C | 3 | cured rapidly on hot plate |
| 52% $HNO_3$ in $H_2O$ | 15 min. | 25–40°C | 1 | darker in color |
| 46% $HNO_3$ in $H_2O$ | 20 min. | 25–45°C | 1 | dark, smooth coating |

The data given in Table 3 above show that the aqueous solutions of the treating agents, of a given concentration, respond substantially to variations in treating time and treating temperature. Thus, the fusibility and curability can be slightly, substantially, or dramatically modified. Similarly, the effects of the invention treatments can also be modified by varying the concentration of the treating agent in the treating solution. The data indicate that the resin can be converted from an easily fusible material to an essentially infusible material, encompassing a range wherein the curability and the film-forming ability of the resin is substantially improved.

EXAMPLE IV

In addition to significantly influencing the curability of PPS resins, the invention treatments also have a significant effect upon the processability of the resin. Specifically, the treatment of the invention can dramatically modify the melt flow of the resins. Indeed, if overdone, the melt flow of the resin can be reduced to essentially zero.

Table IV below illustrates the effect of various invention treatments on the melt flow of PPS resins.

Table IV

Melt Flows of Treated PPS Resin

| Reagent | Treatment Conditions Time | Temp. °C | Melt Flow[1] g/10 min. |
|---|---|---|---|
| None (control) | — | — | 6000 |
| 0.25eq $H_2O_2$ | 60 min. | 100 | 1000 |
| 0.50eq $H_2O_2$ | 60 min. | 100 | 0 |
| 0.25eq NaOCl | 120 min. | 100 | 610 |
| 0.50eq NaOCl | 120 min. | 100 | 18 |
| 50% $HNO_3$ | 60 min. | 25 | 780 |

[1]ASTM-D-1238 Procedure B at 550°F to minimize curing in Plastometer apparatus.

The above data show that each of the invention treatments is capable of reducing the melt flow of the resin to a range which is more suitable for processing techniques such as injection molding and the like. It is also seen that severe treatment can render the resin infusible at 550°F (no melt flow).

EXAMPLE V

A copolymer resin, prepared as in Example I except that the aromatic monomer consisted of about 94 mole percent dichlorobenzene and about 6 mol percent dichlorotoluene and had a melting point of about 522°F, was subjected to the hydrogen peroxide treatment of the present invention.

In a procedure similar to that of the preceding examples, 21.6 g of the copolymer, 200 ml glacial acetic acid, and 5.7 g of 30 percent aqueous hydrogen peroxide (0.25 equivalents) were heated at reflux for about 4 hours until the mixture was neutral to starch-iodide paper. The treated resin was separated by filtration, washed and dried.

A coating dispersion was prepared from 10.0 g of the treated copolymer resin, 35 ml propylene glycol, and 3 g titanium dioxide pigment. This mixture was subjected to the previously described coating test and compared with non-treated copolymer resin.

The invention treated copolymer resin gave a 3/16-inch mandrel bend rating of 1 after curing 30 minutes at 550°C. The untreated copolymer resin gave only a mandrel bend rating of 3 after curing 30 minutes at 550°F and required 30 minutes at 600°F to achieve a 1 rating. Thus, the invention treatment was shown to improve the curability of the copolymer resin by making it curable at a lower temperature.

In another run, a copolymer resin prepared from 80 mole percent dichlorobenzene and 20 mole percent dichlorotoluene and having a melting point of about 430°F was similarly treated with 0.25 equivalents of hydrogen peroxide. Coatings were prepared from both the untreated and treated 20 percent dichlorotoluene copolymer resin from a propylene glycol dispersion but in the absence of titanium dioxide pigment.

After curing for 30 minutes at 450°F, the treated copolymer resin was found to give a black, smooth, cured and brittle coating whereas the untreated copolymer resin was light tan, very brittle, and cured very little Thus, the invention treatment permitted satisfactory curing of this copolymer at a lower temperature than that required for the untreated resin.

Reasonable variations and modifications, which will be apparent to those skilled in the art, can be made in this invention without departing from the spirit and scope thereof.

What is claimed is:

1. A process for improving the physical and chemical properties of an arylene sulfide polymer which comprises treating said polymer in particulate form with a fluid treating agent selected from the group consisting of hydrogen peroxide, an alkali metal or alkaline earth metal hypochlorite and chlorine under conditions of concentration of treating agent, time and temperature to effect the desired improvement, and thereafter separating said treating agent and said polymer and recovering the treated polymer.

2. The process of claim 1 wherein said arylene sulfide polymer is treated to reduce the melt flow of said polymer to a level ranging from about 0.1 to 70 percent of its original melt flow.

3. The process of claim 1 further comprising the application of said treated polymer as a coating upon a suitable substrate and thereafter curing said coating in air by heating said coating in the presence of oxygen to produce an adhering and cohesive coating on said substrate.

4. The process of claim 1 further comprising molding said treated polymer and thereafter curing the thus-molded article by heating at a temperature in the approximate range of 600°–900°F.

5. The process of claim 4 wherein said treated polymer is molded at ambient temperature at a pressure ranging from 5,000 to 20,000 psig, the thus-molded article is removed from the mold and cured by heating at a temperature ranging up to about 700°F.

6. The process of claim 1 wherein said treating agent is hydrogen peroxide.

7. The process of claim 1 wherein said treating agent is sodium hypochlorite.

8. The process of claim 1 wherein said treating agent is chlorine.

* * * * *